(12) United States Patent
Yang et al.

(10) Patent No.: US 10,747,059 B2
(45) Date of Patent: Aug. 18, 2020

(54) DISPLAY APPARATUS HAVING PATTERN OF SLITS ON TOP-COMMON ELECTRODE

(71) Applicant: Innolux Corporation, Chu-Nan, Miao-Li County (TW)

(72) Inventors: Shun-Chen Yang, Chu-Nan (TW); Yu-Lun Hsu, Chu-Nan (TW); Ying-Tong Lin, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 0 days.

(21) Appl. No.: 16/156,658

(22) Filed: Oct. 10, 2018

(65) Prior Publication Data
US 2019/0041702 A1    Feb. 7, 2019

Related U.S. Application Data

(63) Continuation of application No. 15/203,750, filed on Jul. 6, 2016, now Pat. No. 10,133,122.

(30) Foreign Application Priority Data

Jul. 29, 2015   (CN) .......................... 2015 1 0454606

(51) Int. Cl.
*G02F 1/1337* (2006.01)
*G02F 1/1343* (2006.01)

(52) U.S. Cl.
CPC .................. *G02F 1/133707* (2013.01); *G02F 2001/134318* (2013.01); *G02F 2001/134372* (2013.01)

(58) Field of Classification Search
CPC ... G02F 1/133707; G02F 2001/134318; G02F 2001/134372
See application file for complete search history.

(56) References Cited

U.S. PATENT DOCUMENTS

| 9,417,491 | B2 | 8/2016 | Chae et al. |
| 2007/0024789 | A1 | 2/2007 | Itou et al. |
| 2007/0177090 | A1 | 8/2007 | Shimomaki |
| 2009/0244464 | A1* | 10/2009 | Kobayashi ........ G02F 1/133707 349/132 |
| 2010/0007835 | A1 | 1/2010 | Shimomaki |
| 2011/0187976 | A1 | 8/2011 | Tanno |
| 2014/0092352 | A1 | 4/2014 | Kuriyama et al. |

(Continued)

OTHER PUBLICATIONS

Chinese Office Action dated Dec. 11, 2018.

*Primary Examiner* — Nathanael R Briggs
(74) *Attorney, Agent, or Firm* — Rabin & Berdo, P.C.

(57) ABSTRACT

A display apparatus including a first substrate, a second substrate and a display medium is provided. The display medium is disposed between the first substrate and the second substrate. The first substrate includes a first data line, a second data line and a pixel. The first data line and the second data line respectively disposed over a first base plate. The pixel includes a pixel electrode layer and a common electrode layer. The pixel electrode layer is electrically connected to one of the first data line and the second data line. The common electrode layer is formed over the pixel electrode layer and includes a first slit nearest to the first data line. The first slit has a first end and a second end. The first slit is bent at the first end of the first slit but is not bent at the second end of the first slit.

10 Claims, 12 Drawing Sheets

(56) References Cited

U.S. PATENT DOCUMENTS

| | | | |
|---|---|---|---|
| 2014/0313463 A1* | 10/2014 | Jang | G02F 1/136209 |
| | | | 349/106 |
| 2015/0055043 A1* | 2/2015 | Sakai | G02F 1/134363 |
| | | | 349/42 |
| 2015/0346562 A1 | 12/2015 | Moriyama et al. | |
| 2016/0178980 A1* | 6/2016 | Zheng | G02F 1/134363 |
| | | | 257/390 |

\* cited by examiner

DISPLAY APPARATUS HAVING PATTERN OF SLITS ON TOP-COMMON ELECTRODE

This is a continuation application of U.S. application Ser. No. 15/203,750, filed on Jul. 6, 2016, which claims the benefit of People's Republic of China application Serial No. 201510454606.7, filed on Jul. 29, 2015, the subject matter of which is incorporated herein by reference.

BACKGROUND OF THE INVENTION

Field of the Invention

The disclosure relates in general to a display apparatus, and more particularly to a display apparatus having pattern of slits on a common electrode formed over a pixel electrode layer.

Description of the Related Art

Nowadays, electronic products with display panel have become indispensable necessities to modern people in their everyday life, work, study, and entertainment. Examples of electronic products include smart phones, PC tablets, notebooks, monitors and TVs. Of the above electronic products, display apparatus with liquid crystal display (LCD) panel is most popular. Particularly, LCD apparatus, having the advantages of simple application, lightweight, portability, lower cost, higher reliability, and being friendly to viewers' eyes, has replaced cathode ray tube (CRT) monitor and become the most popular display apparatus. The LCD apparatus also provides a diversity of choices in terms of size, shape and resolution.

During the manufacturing process of a display apparatus, many details need to be considered. For example, during the patterning process of a metal layer and a semiconductor layer (such as using lithography and etching), high accuracy is required, lest the wires might be broken. Also, relative position and pattern design of each layer need to assure that the final product of the display apparatus has more stable and superior electronic properties and meet various requirements of product specification. If the display apparatus has poor design, both conformity rate and reliability will deteriorate, and display quality will be affected.

SUMMARY OF THE INVENTION

The disclosure is directed to a display apparatus. Through special pattern design of slits on the common electrode formed over the pixel electrode layer, display quality of the display apparatus is improved and becomes more stable, and product conformity rate is increased.

According to one embodiment of the disclosure, a display apparatus is provided. The display apparatus includes a first substrate, a second substrate, and a display medium disposed between the first substrate and the second substrate. The first substrate includes a gate line, a first data line and a second data line, wherein the first data line and the second data line are disposed over a first base plate and intersect with the gate line to define a pixel. The pixel includes a pixel electrode layer electrically connected to one of the first data line and the second data line, and a common electrode layer formed over the pixel electrode layer. The common electrode layer at least includes a first slit nearest to the first data line and a second slit nearest to the second data line. The first slit has a first end portion adjacent to the gate line, a second end portion away from the gate line, and a first straight portion disposed between the first end portion and the second end portion to connect the first end portion and the second end portion. The second slit has a third end portion adjacent to the gate line, a fourth end portion away from the gate line, and a second straight portion disposed between the third end portion and the fourth end portion to connect the third end portion and the fourth end portion. A largest distance from the edge of the first end portion near the first data line to the first data line is defined as a first distance. A largest distance from the edge of the second end portion near the first data line to the first data line is defined as a second distance. A largest distance from the edge of the third end portion near the second data line to the second data line is defined as a third distance. A largest distance from the edge of the fourth end portion near the second data line to the second data line is defined as a fourth distance. The first distance is smaller than the second distance. The third distance is larger than the fourth distance.

According to another embodiment of the disclosure, a display apparatus is provided. The display apparatus includes a first substrate, a second substrate, and a display medium disposed between the first substrate and the second substrate. The first substrate includes a gate line, a first data line and a second data line, wherein the first data line and the second data line are disposed over a first base plate and intersect with the gate line to define a pixel. The pixel includes a pixel electrode layer electrically connected to one of the first data line and the second data line, and a common electrode layer formed over the pixel electrode layer. The common electrode layer at least includes a first slit nearest to the first data line and a second slit nearest to the second data line. The first slit has a first end portion adjacent to the gate line, a second end portion away from the gate line, and a first straight portion disposed between the first end portion and the second end portion to connect the first end portion and the second end portion. The second slit has a third end portion adjacent to the gate line, a fourth end portion away from the gate line, and a second straight portion disposed between the third end portion and the fourth end portion to connect the third end portion and the fourth end portion. A first end portion tangent line of the first end portion parallel to the gate line, a first edge extension line of the first straight portion adjacent to the first data line, and an edge of the first end portion near the first data line form a first area A1. A second end portion tangent line of the second end portion parallel to the gate line, the first edge extension line, and an edge of the second end portion near the first data line form a second area A2. A third end portion tangent line of the third end portion parallel to the gate line, a second edge extension line of the second straight portion adjacent to the second data line, and an edge of the third end portion adjacent to the second data line form a third area A3. A fourth end portion tangent line of the fourth end portion parallel to the gate line, the second edge extension line, and an edge of the fourth end portion near the second data line form a fourth area A4. The first area is smaller than the second area and the third area is larger than the fourth area.

The above and other aspects of the disclosure will become better understood with regard to the following detailed description of the preferred but non-limiting embodiment (s). The following description is made with reference to the accompanying drawings.

DETAILED DESCRIPTION OF THE INVENTION

According to a display apparatus disclosed in an embodiment of the present disclosure, electric properties of the display apparatus are improved through special pattern design of slits on the common electrode formed over the pixel electrode layer. For example, after the pixel is turned on, the slit pattern of the common electrode layer can compress the generated dark crinkles to be near gate lines. During operation, the electric field between electrode layers will not be interfered with by the signals, hence avoiding the display quality of the pixel display being affected. For example, the pixel might illuminate when it should not be turned on. Thus, the design of the embodiment increases product conformity rate, and provides more stable and superior display quality to the display apparatus manufactured according to the disclosed design.

The embodiment of the present disclosure can be used in an array substrate of a display apparatus. Exemplarily but not restrictively, the array substrate is such as an array substrate (thin-film transistor substrate) of a liquid crystal display apparatus with fringe filed switching (FFS) display mode.

A number of implementations of the present disclosure are disclosed below with reference to accompanying drawings. It should be noted that the structure and description of the implementations of the present disclosure are for exemplary purpose only, not for limiting the scope of protection of the present disclosure. Although the present disclosure does not illustrate all possible embodiments, a person ordinary skilled in the part can make necessary modifications or adjustments to fit actual needs without breaching the spirit and scope of the present disclosure. Therefore, the embodiments of the present disclosure can also be used in other implementations not disclosed in the present disclosure. Moreover, the accompanying drawings are already simplified to more clearly illustrate the embodiment of the present disclosure, and the dimension scales used in the accompanying drawings are not based on actual proportion of the product. Therefore, the specification and drawings are for explaining and describing the embodiment only, not for limiting the scope of protection of the present disclosure. For elements the same as or similar to above embodiments, the same or similar reference numerals are used to indicate the same or similar elements.

Moreover, use of ordinal terms such as "first", "second", "third", etc., in the specification and claims to modify an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

First Embodiment

Figure 1:
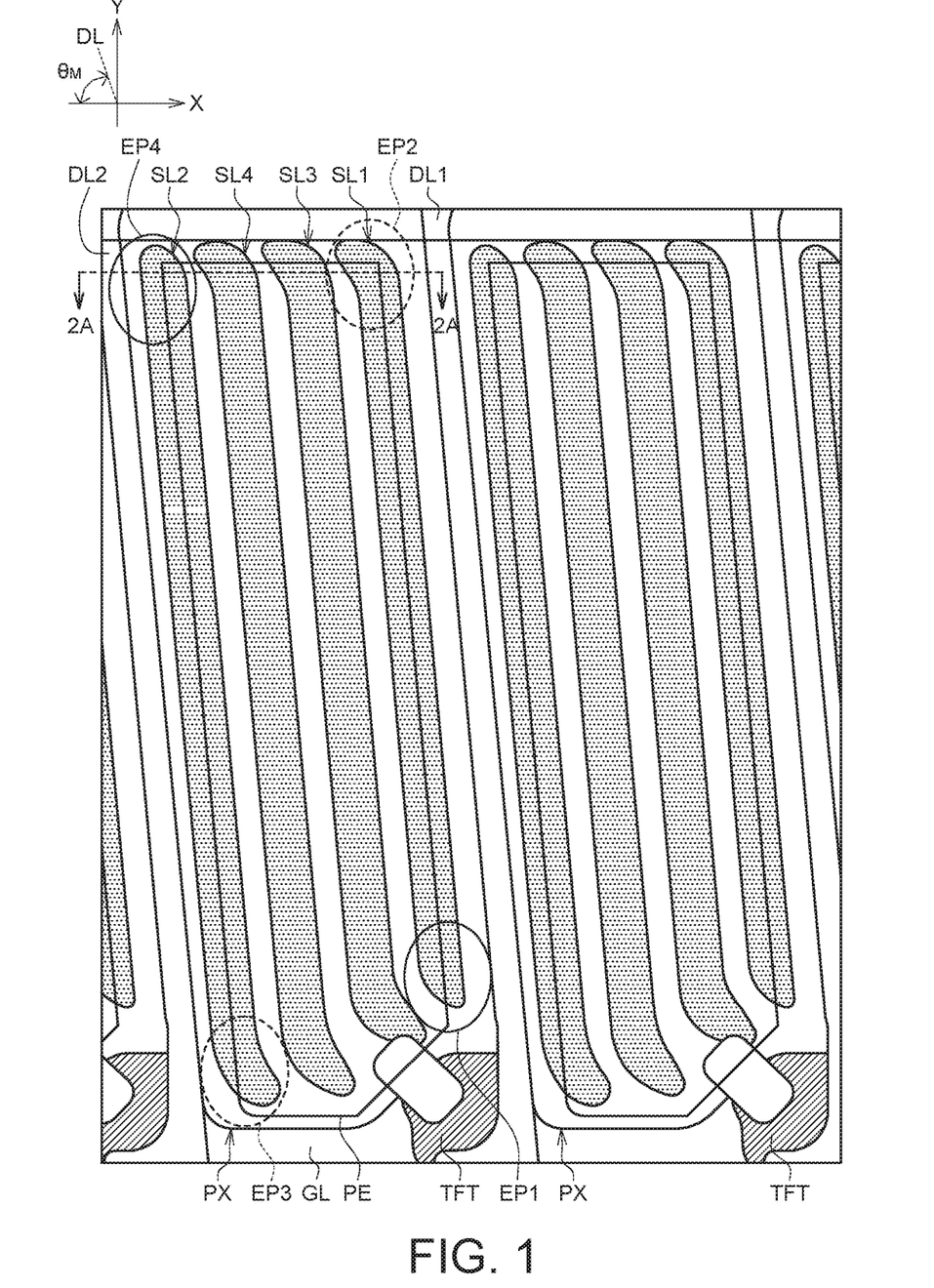
FIG. 1 shows a top view of two adjacent pixels of a display apparatus according to a first embodiment of the present disclosure.
Figure 2A:
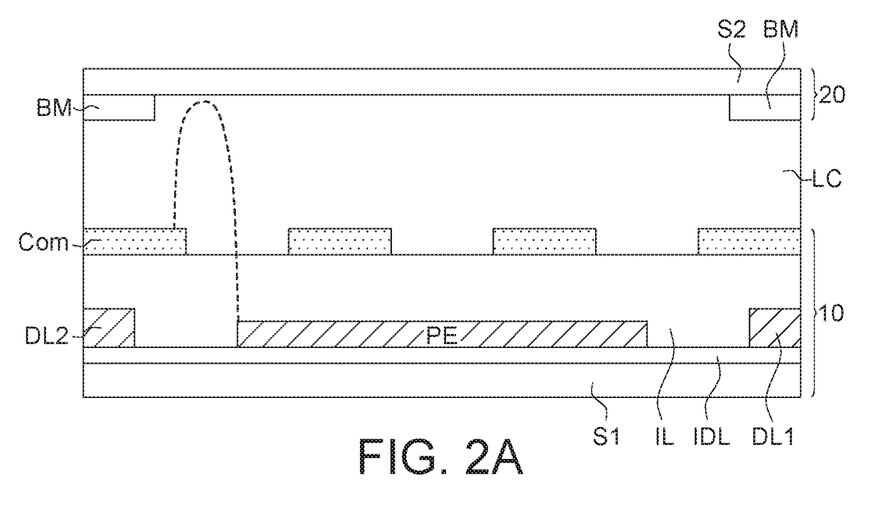
FIG. 2A shows a cross-sectional view of a pixel of a display apparatus along a cross-sectional line 2A-2A of FIG. 1.

FIG. 1 shows a top view of two adjacent pixels of a display apparatus according to a first embodiment of the present disclosure. FIG. 2A shows a cross-sectional view of a pixel of a display apparatus along a cross-sectional line 2A-2A of FIG. 1. In the first embodiment, a display apparatus includes a first substrate 10, a second substrate 20, and a display medium (such as a liquid crystal LC) disposed between the first substrate and the second substrate (FIG. 2A). The first substrate 10 and the second substrate 20 can be realized by such as an array substrate (such as a thin-film transistor (TFT) substrate) and a color filter (CF) substrate respectively. In an embodiment as indicated in FIG. 1, the first substrate 10 includes a first base plate S1, and a plurality of gate lines GL and a plurality of data lines DL formed on the first base plate S1, wherein two adjacent data lines (such as the first data line DL1 and the second data line DL2) intersect with the gate line GL to define a pixel PX. As indicated in FIG. 1 or 2A, the pixel PX includes a pixel electrode layer PE and a common electrode layer Com formed over the pixel electrode layer PE. The pixel electrode layer PE is electrically connected to one of the first data line DL1 and the second data line DL2. In the first embodiment, the pixel electrode layer PE is electrically connected to the first data line DL1; a transistor TFT is disposed correspondingly to the intersection between the gate line GL and the first data line DL1 is connected to the first data line DL1 in series.

Besides, FIG. 2A only illustrates relative positions between the data lines DL, the pixel electrode layer PE, the common electrode layer Com, and the shielding pattern BM of one single pixel in the first embodiment. Furthermore, an insulating layer IL is formed between the common electrode layer Com and the pixel electrode layer PE, and an interlayer dielectric IDL disposed on the first base plate S1 is disposed under the pixel electrode layer PE. As disclosed in the present embodiment, the pixel electrode layer PE can be realized by an electrode such as a transparent conductive film (an indium tin oxide (ITO) film), and the common electrode layer Com formed over the pixel electrode layer PE can be realized by a patterned electrode such as a patterned ITO film having at least two or more slits extending along the data lines. The electric field generated between the common electrode layer Com and the edge of the pixel electrode PE can be used to rotate liquid crystal molecules LC (for example, in the FFS display mode). In an embodiment, the second substrate 20 includes a second base plate S2 and a shielding pattern (such as a black matrix BM) disposed on the second base plate S2. The shielding pattern is disposed right over the data lines (such as DL1 and DL2), not only separating different colors of photo-resistance but also shielding the data lines.

Refer to FIG. 1. Examples of the slits of the common electrode layer Com include a first slit SL1 nearest to the first data line DL1, a second slit SL2 nearest to the second data line DL2, a third slit SL3, and a fourth slit SL4 disposed between the first slit SL1 and the second slit SL2. Although it is exemplified in the present embodiment that four slits correspond to one pixel PX, but the present disclosure is not limited thereto, and the quantity of slits can be adjusted according to actual needs. In the present embodiment, the end portions of the slits have special design. For example, most end portions bend to form a crab shape for compressing the generated dark crinkles. Of the first slit SL1 nearest to the first data line DL1, the end portion (such as the part of the first end portion EP1 marked with a solid circle as indicated in FIG. 1) adjacent to the gate line G does not have a bend, and only the other end portion (such as the part of the second end portion EP2 marked with a dotted circle as indicated in FIG. 1) has a bend and specifically bends towards the second slit SL2. Of the second slit SL2 nearest to the second data line DL2, the end portion (such as the part of the fourth end portion EP4 marked with a solid circle as indicated in FIG. 1) away from the gate line GL does not have a bend, and only the other part of the end portion (such as the part of the third end portion EP3 marked with a dotted circle as indicated in FIG. 1) has a bend and specifically bends towards the first slit SL1.

Figure 2B:
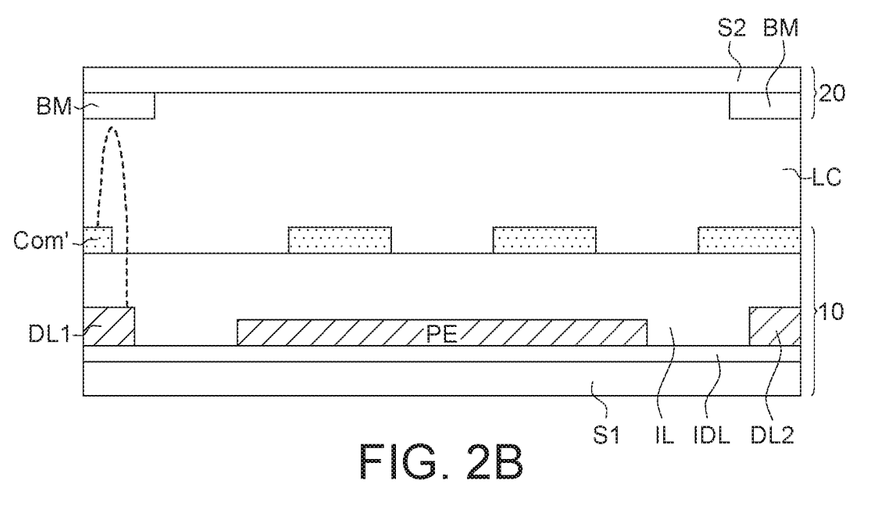
FIG. 2B shows a cross-sectional view of a pixel of a display apparatus, wherein the first slit nearest to the first data line already exposes a portion of the first data lines thereunder.

Suppose the two ends of the first slit SL1 nearest to the first data line DL1 both have a bend (that is, the first end portion EP1 also has a bend), and/or the two ends of the second slit SL2 nearest to the second data line DL2 both have a bend (that is, the fourth end portion EP4 also has a bend). Then, the first slit SL1 and/or the second slit SL2 of the common electrode layer, being too close to the data lines thereunder, may even overlap and expose the data lines thereunder, and affect the display quality. Referring to FIG. 2B, a cross-sectional view of a pixel of a display apparatus is shown. The first slit SL1 nearest to the first data line DL1 already exposes a portion of the first data line DL1 thereunder. Refer to the pattern of the common electrode layer Com' as indicated in FIG. 2B. During operation, signals are continuously provided to the data line (such as the first data line DL1). If the data line is not appropriately shielded by the common electrode layer Com', the electric field will continuously be interfered with by the signals of the data line (such as upsurge from the electric field of data lines), and affect the display quality of the pixel display. For example, the pixel might illuminate when it should not be turned on. In comparison to FIG. 2B, the special design of the slit end portions of the common electrode layer Corn according to the present embodiment (such as FIG. 2A) effectively avoids the common electrode layer Corn being too close to or even exposing the data lines thereunder, such that display quality of the display apparatus is improved and becomes more stable. Moreover, during the patterning process of the common electrode layer, even when the positions of the slits are slightly biased, the common electrode layer will not expose the data lines thereunder. Thus, the design of the present embodiment also increases product conformity rate.

Second Embodiment

Figure 3:
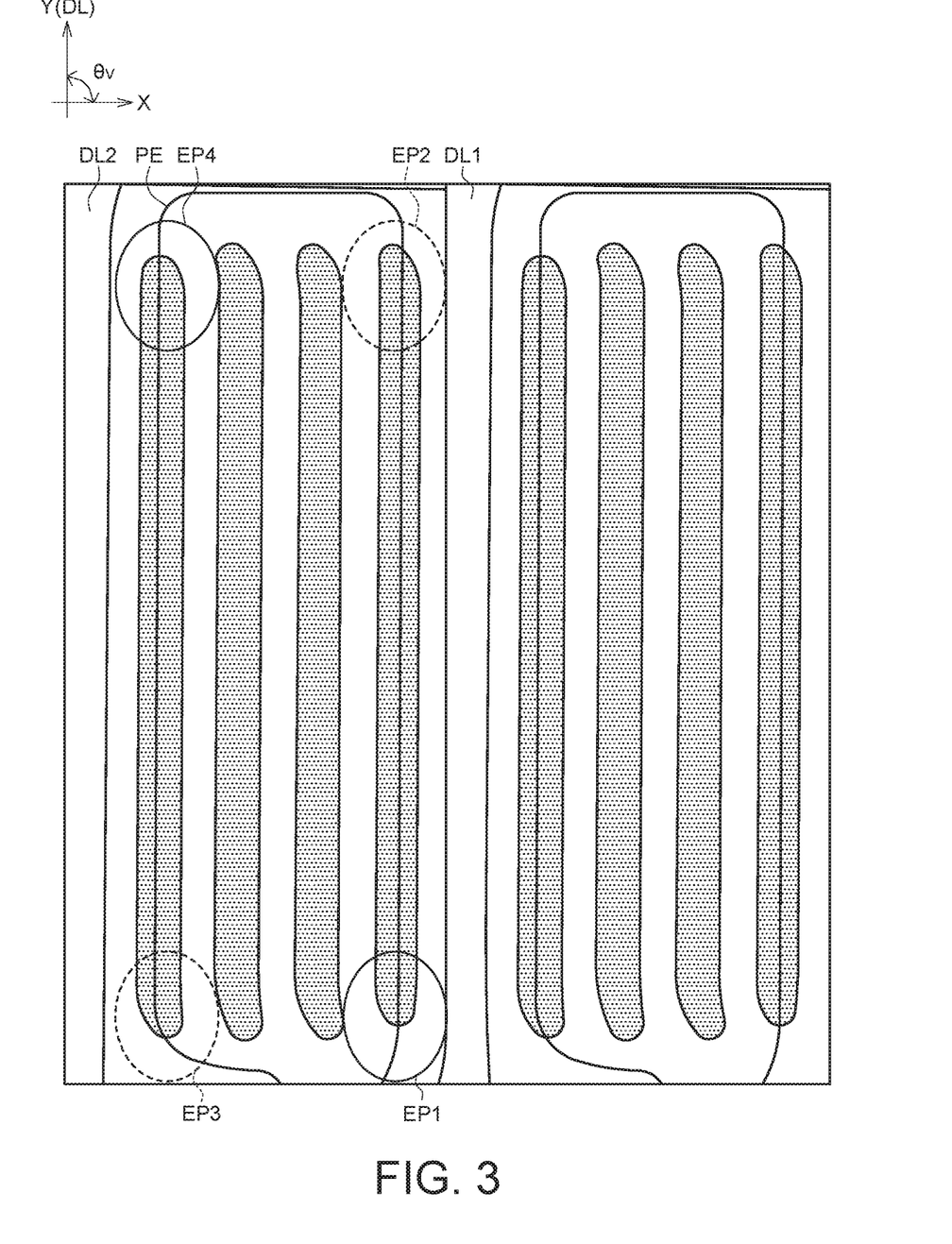
FIG. 3 shows a top view of two adjacent pixels of a display apparatus according to a second embodiment of the present disclosure.

FIG. 3 shows a top view of two adjacent pixels of a display apparatus according to a second embodiment of the present disclosure. The second embodiment and the first embodiment have the same design of slit end portions of the common electrode layer (the same reference numerals are used for the same components). For example, of the first slit SL1 nearest to the first data line DL1, the first end portion EP1 adjacent to the gate line GL does not have a bend; of the second slit SL2 nearest to the second data line DL2, the fourth end portion EP4 away from the gate line GL does not have a bend either. Other remaining end portions of the slits have the bend. Details of the components are described with reference to the first embodiment, and are not repeated here. The first embodiment and the second embodiment mainly differ in the shape of the pixel.

In the first embodiment, the pixel is a parallelogram, and the angle $\theta_M$ formed by the data line (such as the first data line DL1, the second data line DL2) and the extending direction of the gate line GL is an acute angle (FIG. 1). Furthermore, for the adjacent pixel disposed on the same column but the next row, the angle formed by the data line and the extending direction of the gate line GL is also an acute angle, but the data lines of two adjacent pixels form a obtuse angle (<-shaped, not 180°). That is, two domains are formed in two adjacent pixels of the same column.

In the second embodiment, the pixel is a rectangle, and the angle $\theta_V$ formed by the data line and the extending direction of the gate line GL is a right angle (FIG. 3). Furthermore, for the pixel disposed on the same column but the next row, the angle formed by the data line and the extending direction of the gate line GL is also a right angle. That is, no domain is formed in two adjacent pixels of the same column.

No matter what shape the pixel has and no matter whether the angle formed by the data line and the extending direction of the gate line GL is an acute angle or a right angle, the design of slit end portions of the common electrode layer of the present disclosure is still applicable thereto.

Third Embodiment

Figure 4A:
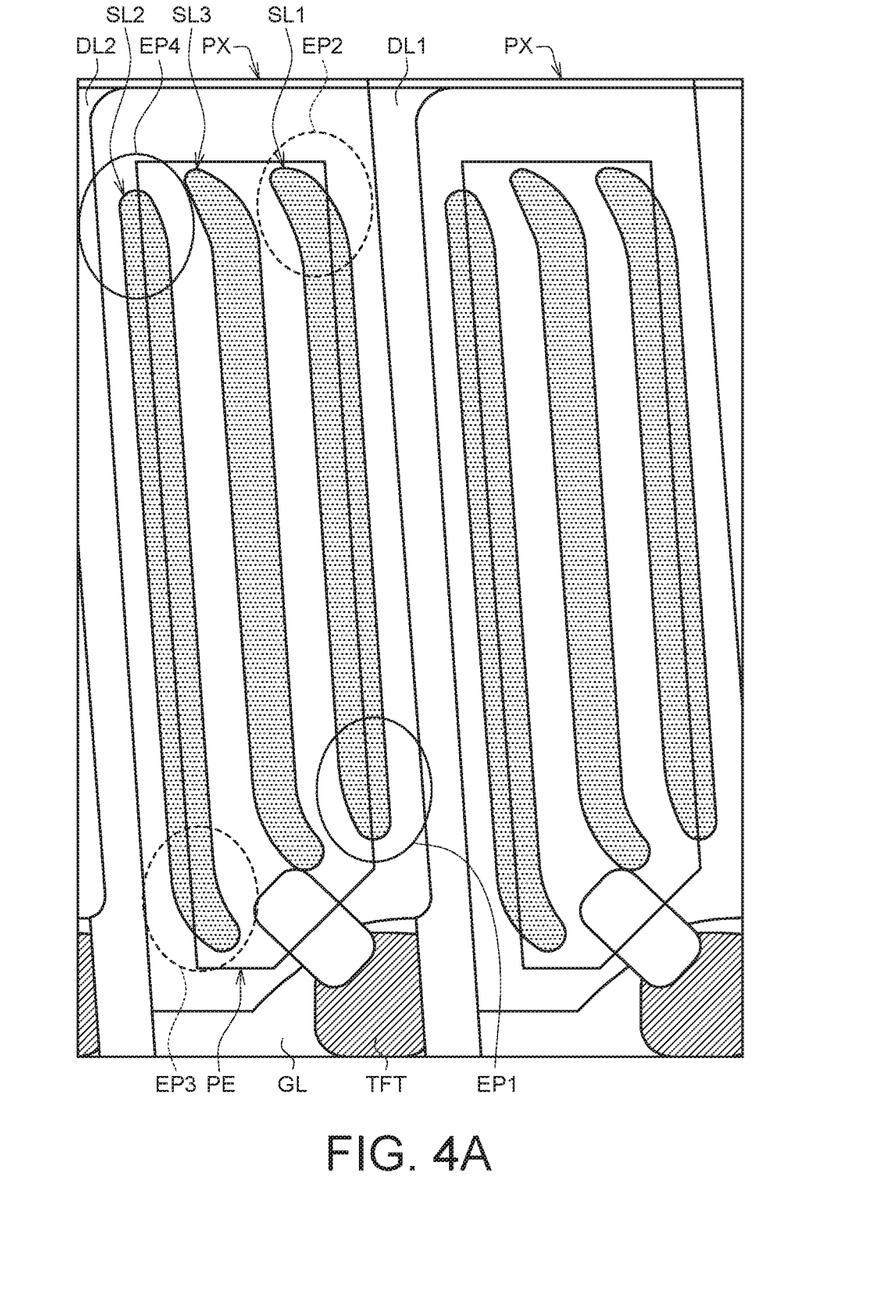
FIG. 4A and FIG. 4B respectively show a top view of two adjacent pixels of a display apparatus according to a third embodiment of the present disclosure, and respectively have 3 slits and 2 slits in a pixel region.
Figure 4B:
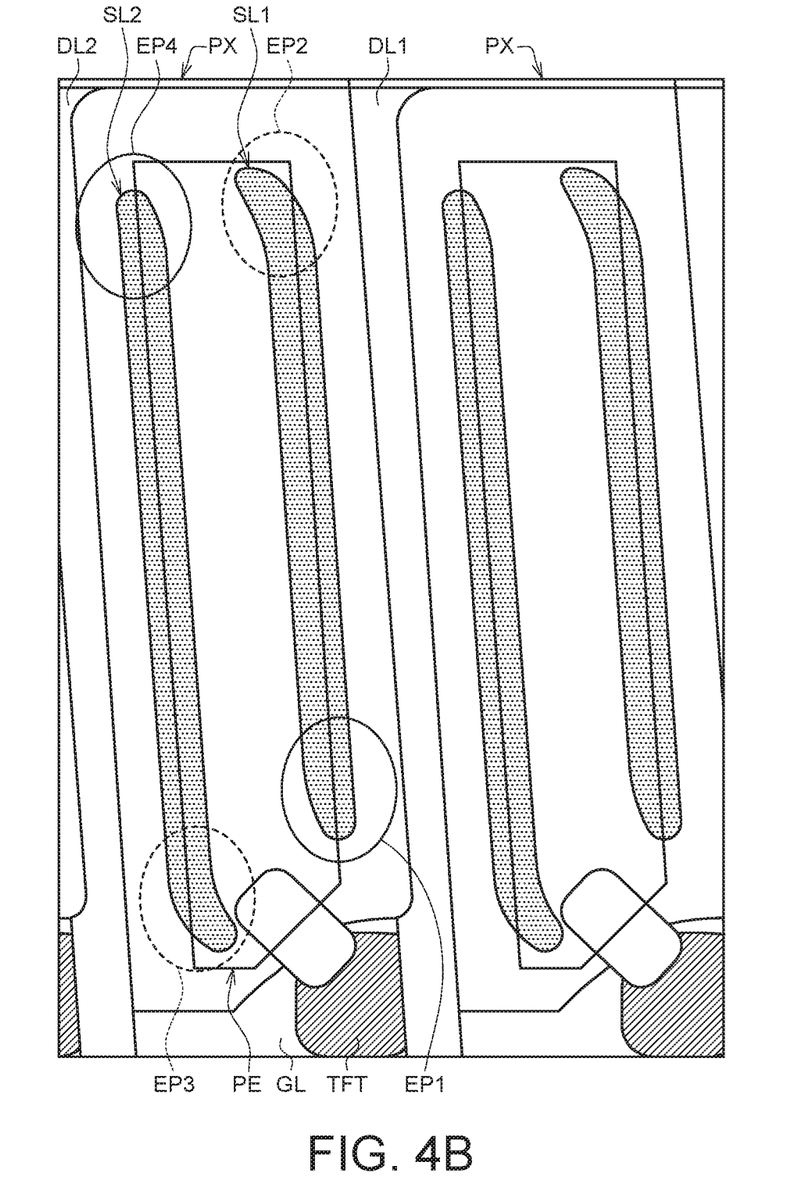

FIG. 4A and FIG. 4B respectively show a top view of two adjacent pixels of a display apparatus according to a third embodiment of the present disclosure. The two adjacent pixels respectively have 3 slits and 2 slits in a pixel region. The design of slit end portions of the common electrode layer is the same in the third embodiment and the first embodiment. The same reference numerals are used for the same components. For example, of the first slit SL1 nearest to the first data line DL1, the first end portion EP1 adjacent to the gate line GL does not have a bend; of the second slit SL2 nearest to the second data line DL2, the fourth end portion EP4 away from the gate line GL does not have a bend either. Other remaining end portions of the slits have the bend. The first end portion EP1 and the fourth end portion EP4 have different quantities of slits. Details are described in the first embodiment, and are not repeated here. Furthermore, the pixel PX illustrated in FIG. 4A and FIG. 4B further includes a wire Lcom capable of providing a common voltage. For large-scale panels, the uniformity of the common voltage applied thereto can remain the same or can be increased. No matter the pixel PX has the wire Lcom or not in an implementation, the present disclosure still can be used thereto.

Figure 5:
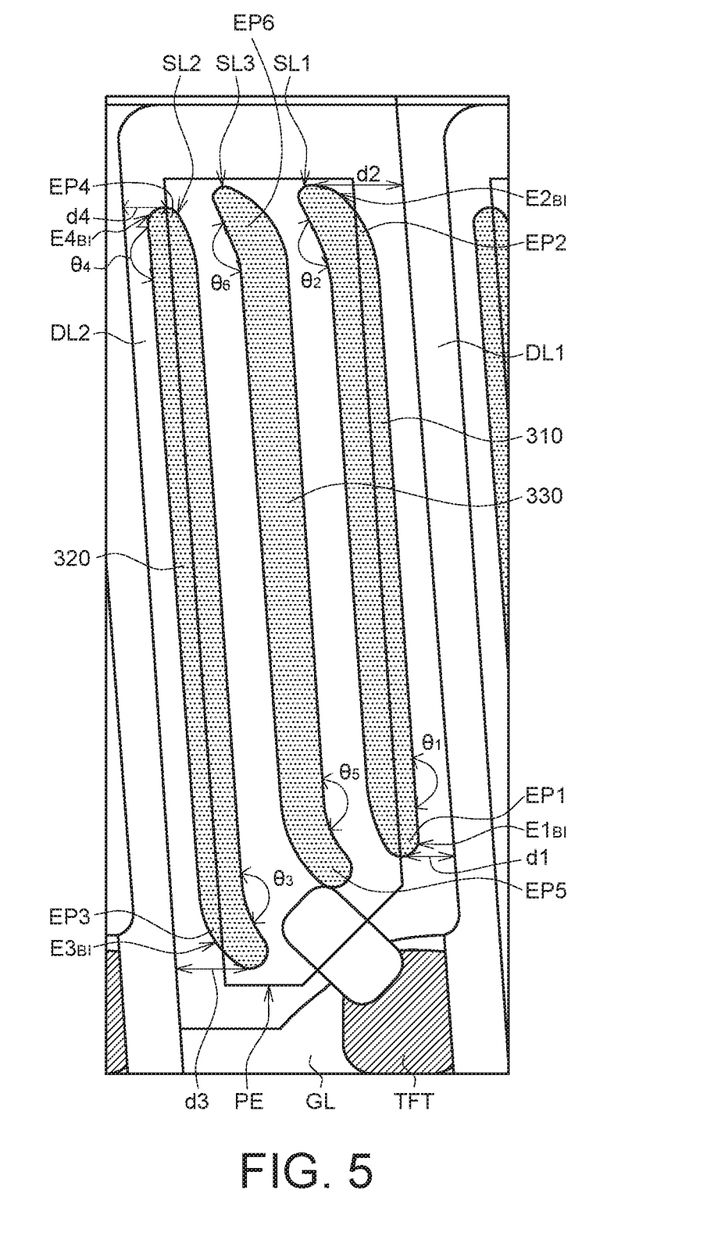
FIG. 5 shows a schematic diagram of a single pixel of the present disclosure.

The components used in the embodiment of the present disclosure and their corresponding relationships are described through the exemplification of a pixel of the display apparatus of the third embodiment. Referring to FIG. 5, a schematic diagram of a single pixel of the present disclosure is shown. Details of the components not illustrated in FIG. 5 can be obtained with reference to the descriptions and drawings disclosed above (such as FIG. 2A). In an embodiment, the display apparatus includes a first substrate 10, a second substrate 20, and a display medium (such as a liquid crystal layer LC) disposed between the first substrate 10 and the second substrate 20 (FIG. 2A). In the first substrate 10, two adjacent data lines (such as the first data line DL1 and the second data line DL2) disposed on the first base plate S1 intersect with the gate line GL to define a pixel PX. The pixel PX includes a pixel electrode layer PE and a common electrode layer Com formed over the pixel electrode layer PE (FIG. 2A). In the third embodiment, the pixel electrode layer PE is electrically connected to the first data line DL1, and a transistor TFT is disposed correspondingly to the intersection between the gate line GL and the first data line DL1 is connected to the first data line DL1 in series. Additionally, the common electrode layer of the pixel PX includes at least two slits. In the third embodiment, the quantity of slits is exemplified by 3 (FIGS. 4A, 4B, 5). As indicated in FIG. 5, the common electrode layer of the pixel PX includes a first slit SL1 nearest to the first data line DL1, a second slit SL2 nearest to the second data line DL2, and a third slit SL3 disposed between the first slit SL1 and the second slit SL2.

In an embodiment, the first slit SL1 has a first end portion EP1 adjacent to the gate line GL, a second end portion EP2 away from the gate line GL, and a first straight portion 310 is disposed between the first end portion EP1 and the second end portion EP2 to connect the first end portion EP1 and the second end portion EP2. The second slit has a third end portion EP3 adjacent to the gate line GL, a fourth end portion EP4 away from the gate line GL, and a second straight portion 320 is disposed between the third end portion EP3 and the fourth end portion EP4 to connect the third end portion EP3 and the fourth end portion EP4. Similarly, the third slit SL3 has a fifth end portion EP5 adjacent to the gate line GL, a sixth end portion EP6 away from the gate line GL, and a third straight portion 330 disposed between the fifth end portion EP5 and the sixth end portion EP6 to connect the fifth end portion EP5 and the sixth end portion EP6. In an embodiment, the first straight portion 310, the second straight portion 320 and the third straight portion 330 extend along the first data line DL1.

A largest distance from the edge $E1_{BI}$ of the first end portion EP1 near the first data line DL1 to the first data line DL1 is defined as a first distance d1. A largest distance from the edge $E2_{BI}$ of the second end portion EP2 near the first data line DL1 to the first data line DL1 is defined as a second distance d2. A largest distance from the edge $E3_{BI}$ of the third end portion EP3 near the second data line DL2 to the second data line DL2 is defined as a third distance d3. A largest distance from the edge $E4_{BI}$ of the fourth end portion EP4 near the second data line DL2 to the second data line DL2 is defined as a fourth distance d4. As indicated in FIG. 5, the first distance d1 is smaller than the second distance d2, and the third distance d3 is larger than the fourth distance d4. Moreover, in an embodiment, the first distance d1 is smaller than the third distance d3, and the fourth distance d4 is smaller than the second distance d2.

Moreover, an angle is formed between each slit end portion and a straight portion connected thereto. For example, the first end portion EP1 of the first slit SL1 and the side of the first straight portion 310 adjacent to the first data line DL1 form a first angle $\theta_1$. The second end portion EP2 and the side of the first straight portion 310 away from the first data line DL1 form a second angle $\theta_2$. The third end portion EP3 of the second slit SL2 and the side of the second straight portion 320 away from the second data line DL2 form a third angle $\theta_3$. The fourth end portion EP4 and the side of the second straight portion 320 adjacent to the second data line DL2 form a fourth angle $\theta_4$. The fifth end portion EP5 of the third slit SL3 and the side of the third straight portion 330 adjacent to the first data line DL1 form a fifth angle $\theta_5$. The sixth end portion EP6 and the side of the third straight portion 330 away from the first data line DL1 form a sixth angle $\theta_6$. In an embodiment, the first angle $\theta_1$ is larger than the second angle $\theta_2$, the third angle $\theta_3$, the fifth angle $\theta_5$, and the sixth angle $\theta_6$ as well. In an embodiment, the fourth angle $\theta_4$ is larger than the second angle $\theta_2$, the third angle $\theta_3$, the fifth angle $\theta_5$, and the sixth angle $\theta_6$ as well. In an embodiment, the first angle θ1 is substantially equivalent to the fourth angle θ4.

In an embodiment, the first angle θ1 and the fourth angle θ4 are substantially equal to (or close to) 180°. That is, the first end portion EP1 of the first slit SL1 does not form a bend configuration with the first straight portion 310 of the first slit SL1, and the fourth end portion EP4 of the second slit SL2 does not form a bend configuration with the second straight portion 320 of the second slit SL2 either (the two portions correspond to one diagonal of the pixel). Additionally, in an embodiment, the first slit SL1 nearest to the first data line DL1 and the second slit SL2 nearest to the second data line DL2 both are designed to have a bending end portion at the position corresponding to one diagonal of the pixel, and the two end portions bend towards each other. For example, the second end portion EP2 of the first slit SL1 bends towards the second slit SL2, and the third end portion EP3 of the second slit SL2 bends towards the first slit SL1 (both the second end portion EP2 and the third end portion EP3 correspond to the other diagonal of the pixel).

Figure 6:
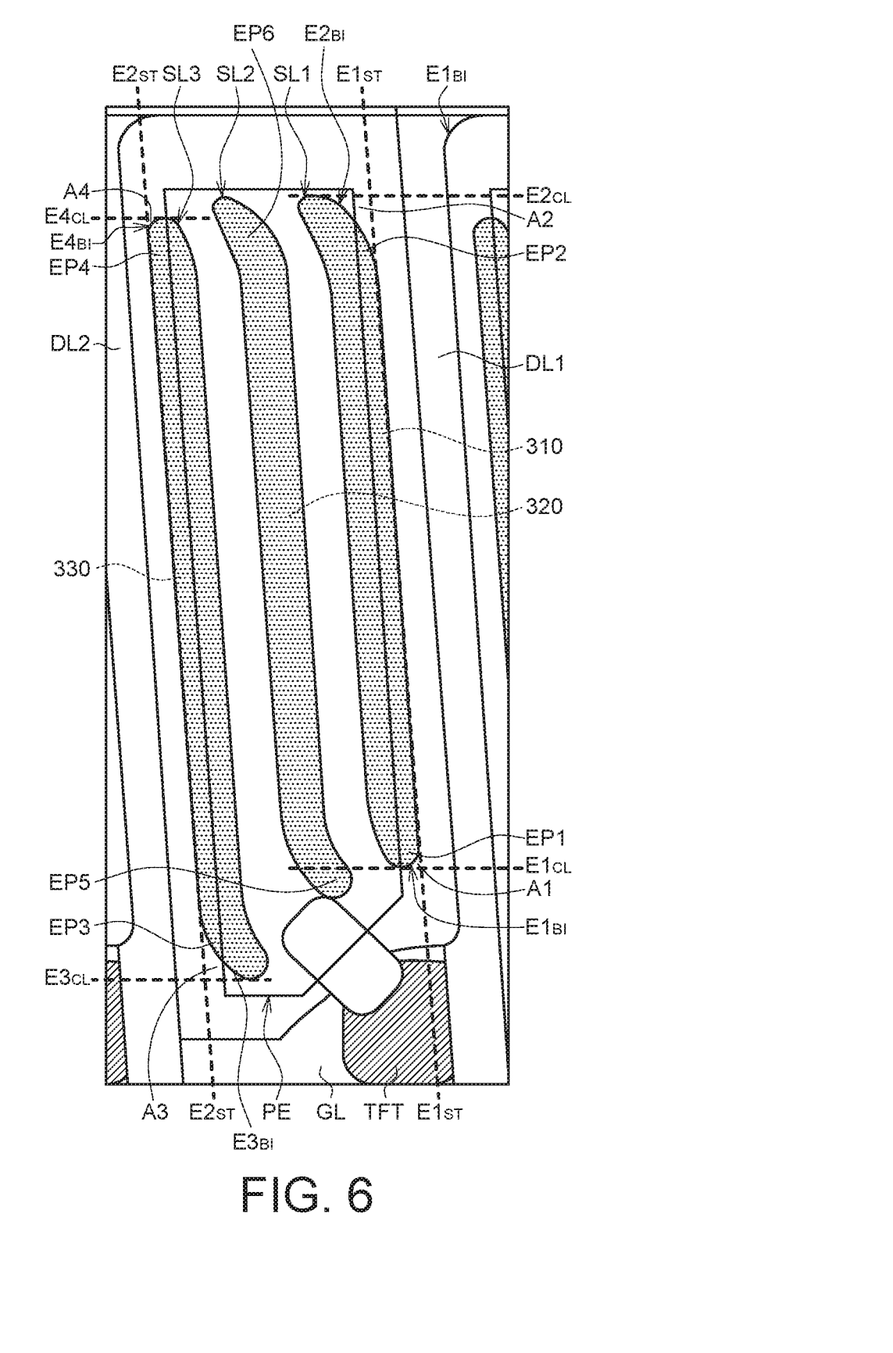
FIG. 6 shows another schematic diagram of a single pixel of the present disclosure.

Additionally, the embodiment is exemplified by the area formed by an end portion tangent line of a slit end portion, an edge, and an edge extension line of a corresponding straight portion. Referring to FIG. 6, another schematic diagram of a single pixel of the present disclosure is shown. Similarly, the common electrode layer of FIG. 6 includes a first slit SL1 (including a first end portion EP1, a first straight portion 310 and a second end portion EP2), a second slit SL2 (including a third end portion EP3, a second straight portion 320 and a fourth end portion EP4) and a third slit SL3 (including a fifth end portion EP5, a third straight portion 330 and a sixth end portion EP6). Details are described with reference to the above description, and are not repeated here. A first end portion tangent line $E1_{CL}$ of the first end portion EP1 parallel to the gate line GL, a first edge extension line $E1_{ST}$ of the first straight portion 310 adjacent to the first data line DL1, and an edge $E1_{BI}$ of the first end portion EP1 near the first data line DL1 form a first area A1. A second end portion tangent line $E2_{CL}$ of the second end portion EP2 parallel to the gate line GL, a first edge extension line $E1_{ST}$, and an edge $E2_{BI}$ of the second end portion EP2 near the first data line DL1 form a second area A2. Similarly, a third end portion tangent line $E3_{CL}$ of the third end portion EP3 parallel to the gate line GL, a second edge extension line $E2_{ST}$ of the second straight portion adjacent to the second data line DL2, and an edge $E3_{BI}$ of the third end portion EP3 near the second data line DL2 form a third area A3. A fourth end portion tangent line $E4_{CL}$ of the fourth end portion EP4 parallel to the gate line GL, a second edge extension line $E2_{ST}$, and an edge $E4_{BI}$ of the fourth end portion EP4 near the second data line DL2 form a fourth area A4. The first area A1 is smaller than the second area A2. The third area A3 is larger than the fourth area A4. Additionally, in an embodiment, the first end portion EP1 and the third end portion EP3 have different bending degrees, and the first area A1 is smaller than the third area A3. In an embodiment, the fourth end portion EP4 and the second end portion EP2 have different bending degrees, and the fourth area A4 is smaller than the second area A2.

Besides, most slit end portions bend to form a crab shape for compressing the generated dark crinkles therein. In an embodiment, a pixel has a non-bending design for the first end portion EP1 of the first slit SL1 nearest to the first data line DL1 and the fourth end portion EP4 of the second slit SL2 nearest to the second data line DL2, such that the pixel electrode can shield the first data line DL1 and the second data line DL2 thereunder. However, the slit end portions adjacent to the data line do not bend, and cannot compress the dark crinkles therein. In an embodiment, the width of the slit end portion adjacent to the data line can be adjusted. For example, as the width of the slit end portion is reduced, the electric field will be intensified, the luminance will be increased and the expansion of dark crinkles will be compensated, such that dark crinkles will be obscured. In an embodiment, on the same horizontal line (such as the horizontal line HL1 of FIG. 7A), the width of the slit end portion adjacent to the data line is smaller than that away from the data line.

Figure 7A:
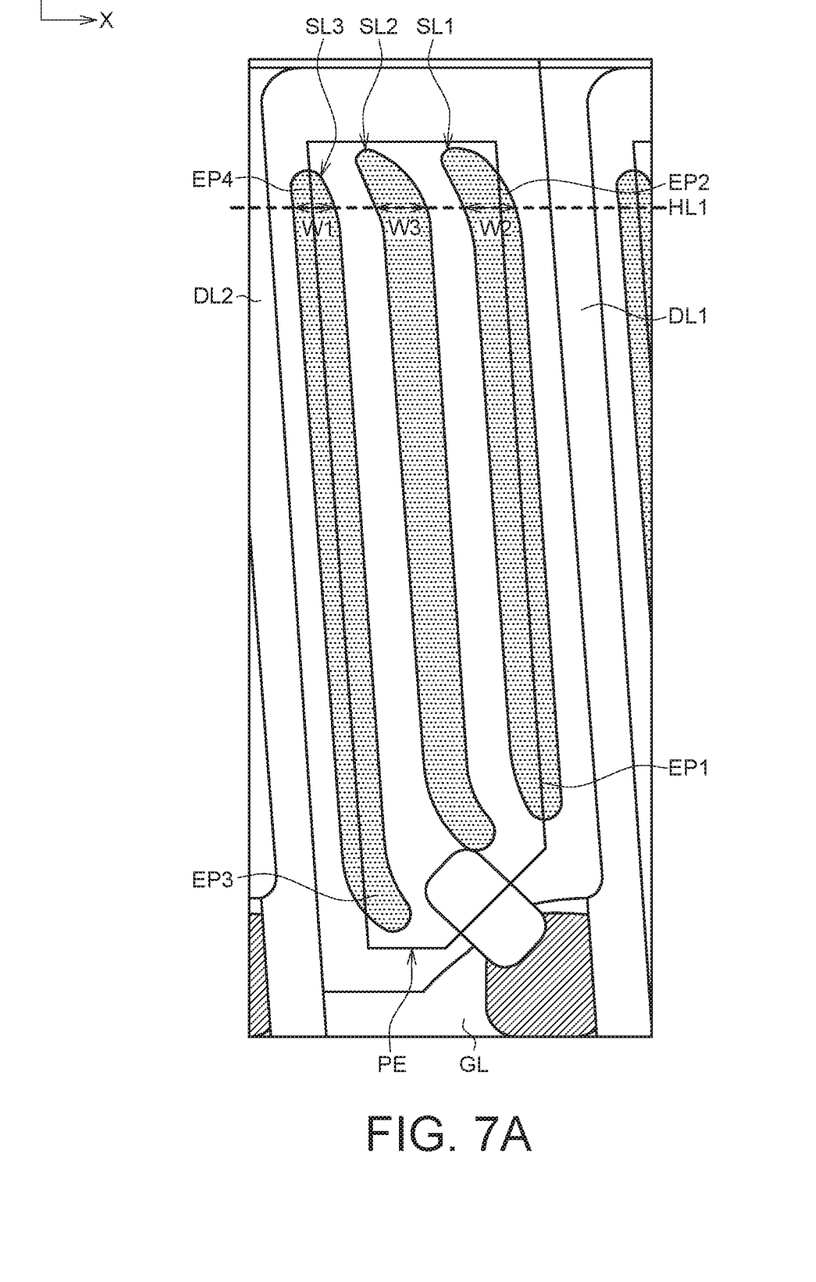
FIG. 7A shows an alternate schematic diagram of a single pixel of the present disclosure.
Figure 7B:
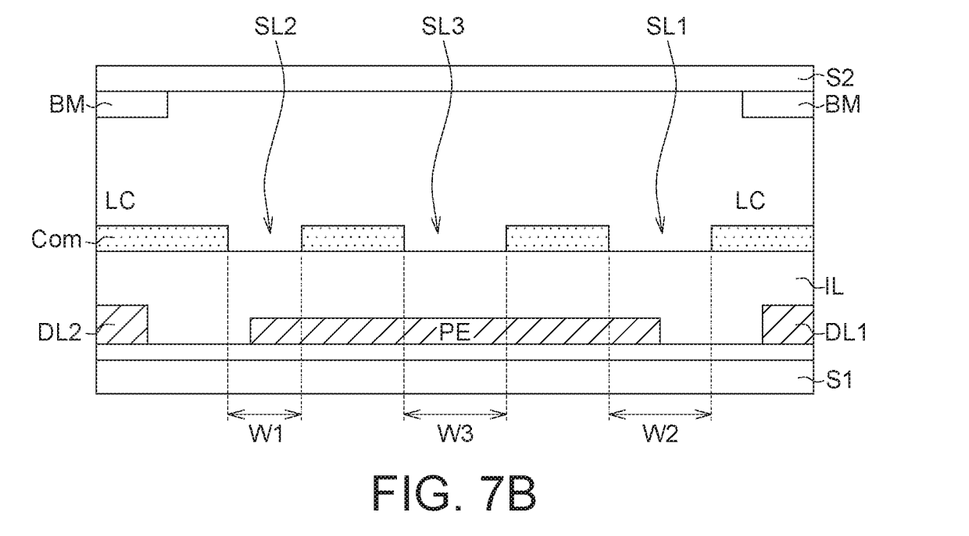
FIG. 7B shows a cross-sectional view of FIG. 7A using a horizontal line HL1 as a cross-sectional line.

Referring to FIG. 7A, an alternate schematic diagram of a single pixel of the present disclosure is shown. FIG. 7A explains the design of the width of the slit end portion of an embodiment. FIG. 7B shows a cross-sectional view of FIG. 7A using a horizontal line HL1 as a cross-sectional line. The fourth end portion EP4 has a first width W1 on the horizontal line HL1. The second end portion EP2 has a second width W2 on the horizontal line HL1. The horizontal line HL1 is substantially parallel to the extending direction of the gate line GL (such as the x-axial direction). In an embodiment, the first width W1 is smaller than the second width W2. Moreover, the sixth end portion EP6 of the third slit SL3 disposed between the first slit SL1 and the second slit SL2 has a third width W3 on the horizontal line HL1. In an embodiment, the first width W1, exemplarily but not restrictively, is smaller than the third width W3. As indicated in FIG. 7B, as the width (such as W1) of the slit end portion (such as the fourth end portion EP4) adjacent to the second data line DL2 is reduced, the electric field will be intensified, the luminance will be increased, and the expansion of dark crinkles will be compensated.

Fourth Embodiment-Sixth Embodiment

Figure 8:
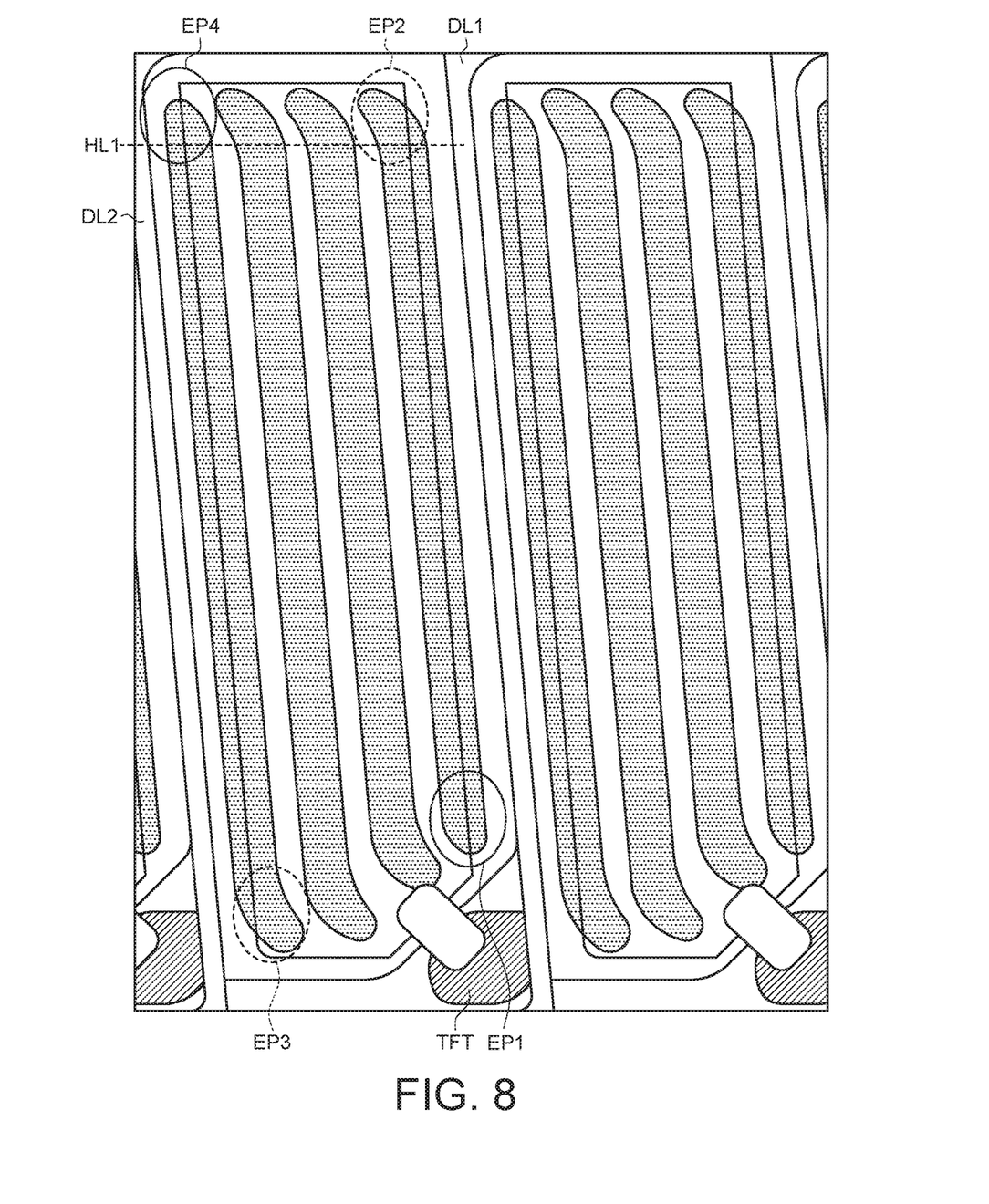
FIG. 8 shows a top view of two adjacent pixels of a display apparatus a according to a fourth embodiment of the present disclosure.
Figure 9:
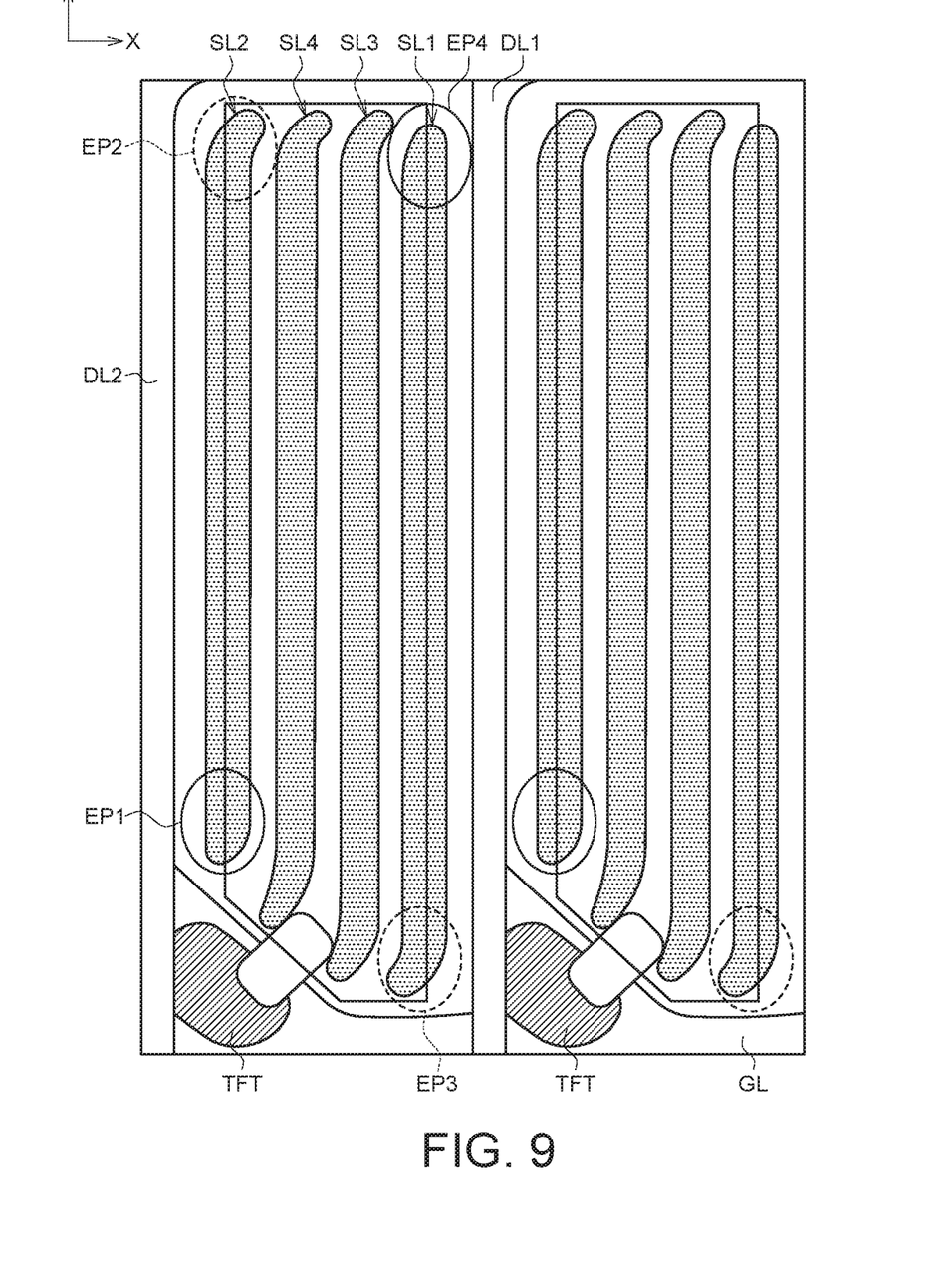
FIG. 9 shows a top view of two adjacent pixels of a display apparatus according to a fifth embodiment of the present disclosure.
Figure 10:
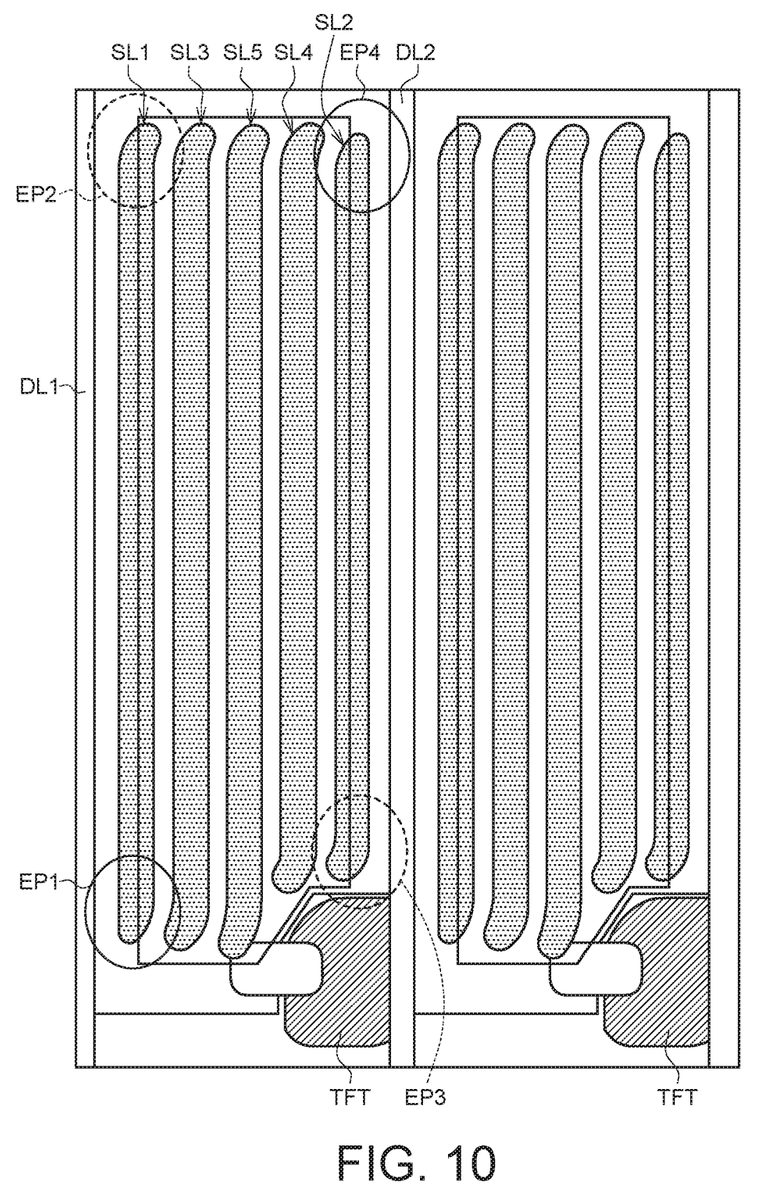
FIG. 10 shows a top view of two adjacent pixels of a display apparatus according to a sixth embodiment of the present disclosure.

FIG. 8 shows a top view of two adjacent pixels of a display apparatus a according to a fourth embodiment of the present disclosure. FIG. 9 shows a top view of two adjacent pixels of a display apparatus according to a fifth embodiment of the present disclosure. FIG. 10 shows a top view of two adjacent pixels of a display apparatus according to a sixth embodiment of the present disclosure. In the drawings of the fourth embodiment to the sixth embodiment, the same reference numerals are used for the components common to that of previous embodiments. It should be noted that the structures and relationships between components in the third embodiment are applicable to other embodiments of the present disclosures (the first, the second, and the fourth to the sixth embodiment). Details of the components are described with reference to above descriptions, and are not repeated here.

The common electrode layer of the fourth embodiment is the same as that of the third embodiment except that the quantity of slits of a pixel changes to 4 (the fourth embodiment) from 3 (the third embodiment). Like the pixel of the first and the third embodiment, the pixel of the fourth embodiment has a parallelogram, and the angle formed by the data line (such as the first data line DL1 or the second data line DL2) and the extending direction of the gate line GL is an acute angle.

The structure of the common electrode layer of the fifth embodiment and the sixth embodiment is the same as that of the third embodiment except that the quantity of slits of a pixel changes to 4 and 5 (the fifth embodiment and the sixth embodiment) from 3 (the third embodiment). Additionally, like the pixel of the second embodiment, the pixel of the fifth and the sixth embodiment has a rectangular shape, and the angle formed by the data line and the extending direction of the gate line GL is a right angle.

It should be noted that in FIG. 9 (the fifth embodiment), the transistor TFT of a pixel is located at the bottom left corner (the transistor TFT is located at the bottom right corner in other embodiments), and the slits, arranged from left to right, respectively are the second slit SL2, the fourth slit SL4, the third slit SL3 and the first slit SL1. The fifth embodiment also conforms to the non-bending design disclosed in the present disclosure. That is, both the first end portion EP1 of the first slit SL1 nearest to the first data line DL1 and the fourth end portion EP4 of the second slit SL2 nearest to the second data line DL2 do not have any bends. Additionally, as indicated in FIG. 9, the width of the first slit SL1 and the second slit SL2 in the x-axial direction is slightly larger than that of the third slit SL3 and the fourth slit SL4 in the x-axial direction.

Moreover, FIG. 10 (the sixth embodiment), the first data line DL1 and the second data line DL2 are respectively marked at the left and the right of the pixel (this is different from other embodiments). The transistor TFT of a single pixel is located at the bottom right corner, and the slits, arranged from left to right, respectively are the first slit SL1 nearest to the first data line DL1, the third slit SL3, the fourth slit SL4, and the second slit SL2 nearest to the second data line DL2. The sixth embodiment also conforms to the non-bending design disclosed in the present disclosure. That is, both the first end portion EP1 of the first slit SL1 and the fourth end portion EP4 of the second slit SL2 dot have any bends. Additionally, as indicated in FIG. 10, the width of the first slit SL1 and the second slit SL2 in the x-axial direction is approximately equivalent to that of the third slit SL3 and the fourth slit SL4 in the x-axial direction, but the present disclosure is not limited thereto.

According to the display apparatus disclosed in an embodiment of the present disclosure, the slit end portions of the common electrode layer formed on the pixel electrode layer has special pattern design. For example, most end portions bend to form a crab shape for compressing the generated dark crinkles therein. Each slit end portion nearest to one of the two data lines only bends at one end (one end is bent but the other end is straight), hence effectively avoiding the slit end portion being too close to or even exposing the data lines thereunder and accordingly avoiding the problem of electric field interference. Furthermore, during the patterning process of the common electrode layer, even when the position of the slits is slightly biased, the design of the embodiment still avoids the data line under the common electrode layer being exposed. Thus, the design disclosed in the embodiment of the present disclosure provides stable and superior display quality to the display apparatus using the same, and also increases product conformity rate.

The structures of FIG. 1, FIG. 3, FIG. 4, FIG. 8-FIG. 10 are for describing some embodiments of the present disclosure, not for limiting the scope of the present disclosure. Other embodiments having different structures are still within the scope of protection of the present disclosure. Examples of different structures are as follows. The common electrode layer may have different quantities of slits (such as 2~n, n is a positive integer 2). The bending parts of the slit end portions may have different bending angles. The slits of the pixel PX may have the same or different widths. The transistor TFT may be connected to the first data line or the second data line in series. The pixel PX may or may not include a wire Lcom capable of providing a common voltage. In a pixel, the angle formed by the data line and the extending direction of the gate line GL may be an acute angle or a right angle. Adjacent pixels may or may not have multiple domains. A person ordinary skilled in the art can make corresponding adjustment and modification to relevant structures of the present disclosure to meet the actual needs in the applications.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus, comprising:
    a first substrate comprising;
        a gate line disposed over a first base plate;
        a first data line and a second data line respectively disposed over the first base plate; and
        a pixel comprising:
            a pixel electrode layer electrically connected to one of the first data line and the second data line; and
            a common electrode layer formed over the pixel electrode layer, wherein the common electrode layer comprises a first slit nearest to the first data line and a second slit nearest to the second data line, wherein the first slit has a first end away from the gate line and a second end near to the gate line, the second slit has a first end away from the gate line and a second end near to the gate line, the first end of the first slit is bent, the second end of the first slit and the first end of the second slit are not bent, and the second end of the second slit is bent;
    a second substrate; and
    a display medium disposed between the first substrate and the second substrate.

2. The display apparatus according to claim 1, wherein a largest distance from the first end of the first slit to the first data line is greater than a largest distance from the second end of the first slit to the first data line.

3. The display apparatus according to claim 1, wherein a transistor is disposed correspondingly to an intersection between the gate line and the first data line.

4. The display apparatus according to claim 1, wherein the first data line and the second data line intersect with the gate line.

5. The display apparatus according to claim 1, wherein the second end of the second slit is bent away from the second data line.

6. The display apparatus according to claim 1, wherein a distance from the second end of the first slit to the gate line is different from a distance from the second end of the second slit to the gate line.

7. The display apparatus according to claim 6, wherein the distance from the second end of the first slit to the gate line is less than the distance from the second end of the second slit to the gate line.

8. The display apparatus according to claim 6, wherein the distance from the second end of the first slit to the gate line is greater than the distance from the second end of the second slit to the gate line.

9. The display apparatus according to claim 1, wherein a length of the first slit is different from a length of the second slit along an extending direction of the first data line.

10. The display apparatus according to claim 9, wherein the length of the first slit is less than the length of the second slit along the extending direction of the first data line.

* * * * *